Feb. 21, 1933.　　　　W. J. MILLER　　　　1,898,561
METHOD OF PRODUCING POTTERY WARE AND MOLDS FOR USE THEREWITH
Filed Oct. 17, 1929
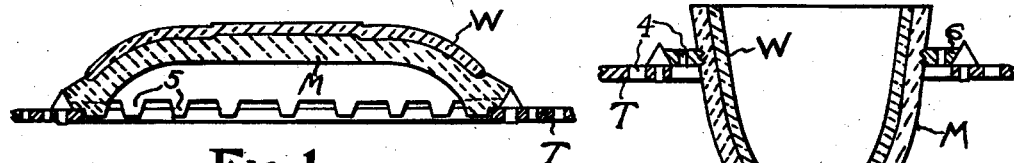
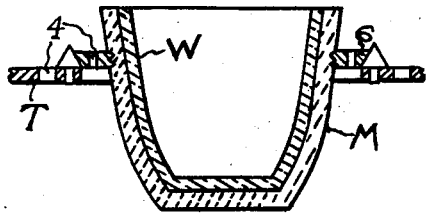
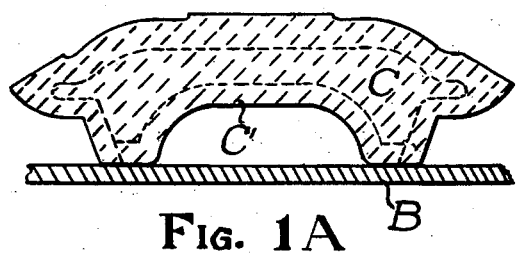
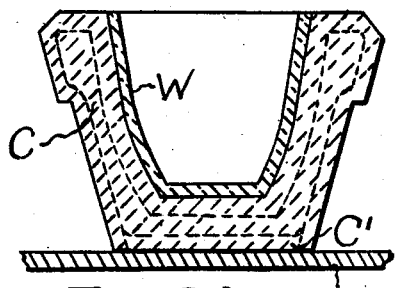
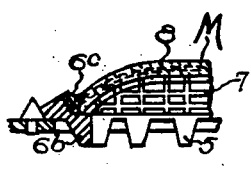
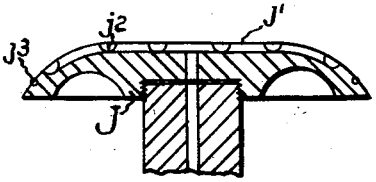
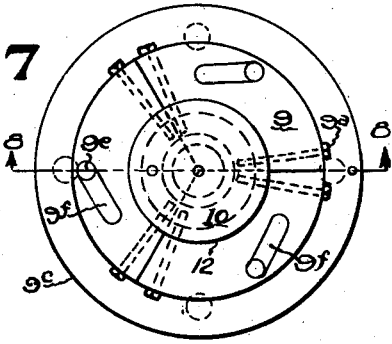
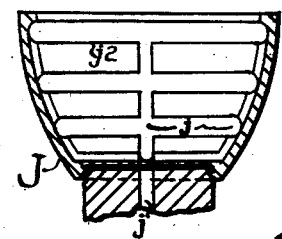
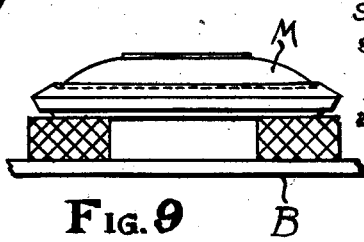
INVENTOR.
William J. Miller.
BY
ATTORNEY.

Patented Feb. 21, 1933

1,898,561

UNITED STATES PATENT OFFICE

WILLIAM J. MILLER, OF SWISSVALE, PENNSYLVANIA

METHOD OF PRODUCING POTTERY WARE AND MOLDS FOR USE THEREWITH

Application filed October 17, 1929. Serial No. 400,349.

This invention relates to a method of producing pottery ware and molds for use therewith.

Generally stated, the method consists in employing molds constructed with a porous mold portion proper which is substantially reduced in cross-sectional thickness relatively to molds which have been universally adopted and standardized in the manufacture of pottery ware, and supporting the molds when placed in a dryer with the formed ware thereon in such manner that the under surfaces of the molds are exposed to the drying atmosphere, to thereby, among other advantages, enable the molds to dry substantially in step with the ware and be in condition for immediate re-use and thus increase the drying efficiency of the molds and production of the ware and materially reduce the cost of mold production.

The present method, while of considerable utility in the production of pottery ware as now commonly practiced, is primarily intended for continuous production by means of automatic machinery, and will function more efficiently when used in conjunction with a modern form of drying apparatus wherein a forced circulation of conditioned air is constantly maintained under selective control.

When producing pottery ware, it has been found advantageous in some fabricating operations to subject the clay bat and ware to the action of a fluid medium such as sub and superatmospheric pressure, through the porous body of the mold, and the present invention also has in view the provision of a mold which will facilitate the application of a suitable fluid medium to the clay bat or ware through the mold.

In the manufacture of jiggered pottery ware as now commonly practiced, the forming or jiggering operation is carried on intermittently, said operation being carried on for about nine hours continuously, then discontinued for fifteen hours and then repeated, except over the week end, when a thirty-nine hour period of inaction is observed. A moist plastic bat or charge of clay is applied to the forming surface of the mold and immediately thereafter shaped into the desired form by the jiggerman, after which the mold with the shaped ware thereon is placed in a drier in which—under recognized ideal drying conditions—air above room temperature having about eighty percent relative humidity is circulated, to bring the ware to the proper temperature before any appreciable drying action takes place, the humidity of the drying air being stepped down and the temperature stepped up until at the termination of the drying period the relative humidity is about ten percent for a brief period, the temperature being limited to a maximum of 135° F. as a higher temperature would cause the usual plaster molds to disintegrate. Then the ware is removed from the mold and the mold re-worked or the cycle of charging, etc., repeated.

Generally speaking, the mold is worked three times in nine hours, the first cycle requiring about one and one-half hours, the second cycle about three hours, and the third cycle about four and one-half hours. Then for the next fifteen hours, the molds are subjected to a drying atmosphere of about ten percent relative humidity to drive out moisture that has accumulated in the interior or core of the thick walls of the mold, from two sources, viz., (a) the three wet clay charges applied thereto and (b) the humid atmosphere into which it is immediately placed after the shaping operation.

The walls of the mold are purposely made thick to provide a storage or accumulating section or core into which the surface moisture of the mold is progressed by capillary attraction and the inherent nature of porous material to establish equilibrium of moisture content. The relatively short period during which the molds are subjected to air of ten percent relative humidity serves only to dry the ware and the exposed surfaces of the mold.

If continuous production is desired, a radically different method of mold construction and drying becomes necessay.

The progressive accumulation of moisture and periodic dehydration theory has to be discarded. Impediments to mold dehydration must be removed to permit or provide for access of the drying air to the moisture extracted from the clay and progressed or absorbed into and through the mold surface.

The present method of mold construction consists in first ascertaining the approximate depth to which the moisture contained in the freshly formed ware for which the mold is adapted will penetrate into a porous molding surface, then casting the mold with a molding surface substantially limited to a thickness as will permit the moisture from the ware to penetrate directly through the mold to the opposite surface thereof and be carried off by the drying atmosphere substantially simultaneously with the drying of the ware, to thereby, among other functions, prevent or minimize storage of moisture from the surrounding atmosphere by the mold and provide for complete drying of the mold during each cycle through the drier.

The present method therefore discards the theory heretofore accepted and completely eliminates the storage section of the mold, retaining only the molding surface and sufficient absorbing cross section to actually absorb the immediate excess moisutre from the freshly formed ware, and also provides for access of drying air directly to the saturated absorbing section of the mold. This section soon becomes saturated by the bat or ware to a greater extent, or contains more moisture, than the eighty percent relative humidity initial drying air and therefore does not absorb additional moisture to any appreciable extent from the air but gives off moisture shortly after being placed in the drier, thus drying the ware equally from top and from bottom, and due to its thin section, has no deep-seated core for accumulating moisture and therefore dries at about the same speed as the ware thereon, so that when the ware is dried throughout and removed, the mold is likewise dried throughout and in condition for repetition of an indefinite number of cycles.

To dry ceramic ware without cracks or flaws in the articles, the humidity of the drying air during the shrinkage period must be relatively great, and during this period, the molds, being initially in a warm bone-dry condition, absorb moisture from the surrounding atmosphere until they are saturated to an equal degree relatively to the air, or equilibrium of moisture content is established. This moisture absorbed by the mold lowers the humidity of the drying atmosphere and is a detriment to the mold as well as to the condition of the surrounding atmosphere of the dryer, or is wasted, and the greater the porous bulk of the mold, the greater will be the amount of moisture absorbed and the longer will be the time required for the mold to dry preparatory to receiving a fresh charge of clay.

For reasons above specified, the present type of mold absorbs moisture from the clay bat or freshly formed ware only and does not absorb moisture from the surrounding atmosphere to any appreciable extent. By the time the ware has been brought to the proper drying temperature, the water of plasticity has penetrated through the wall of the mold, so that when the drying action takes place with respect to the ware, it also takes place with respect to the mold.

The principal cause of deterioration of an absorbant mold is pitting of its working surface, due to the escape or reverse flow of moisture from the core of the mold outwardly through its working surface, this action resulting in erosion or the gradual enlargement of the weakest capillary tubes, which flare outwardly toward the working surface of the mold.

With the present type of mold, the moisture is constantly progressed unidirectionally away from its working surface, and thus the enlarged terminus of the affected capillary tube is on the reverse side of the mold, and pitting of the working surface due to reverse flow of moisture is eliminated.

Obviously, the water of plasticity contained in the ware in or on a mold penetrates the latter to a limited extent only, and therefore any porous material in excess of that actually required to take care of the water of plasticity is superfluous, and furthermore, it insulates the saturated portion of the mold from the drying air and thereby retards drying thereof.

The present method exposes this saturated portion to the atmosphere and provides for more correctly proportioning and greatly increasing the exposed mold surface area in proportion to its bulk relatively to molds as heretofore constructed.

In making molds as now commonly used, it is necessary to provide the mold with an annular thickened portion or extended boss adapted to seat in the socket of the jigger chuck, to center the mold while rotating it during the shaping operation. This boss is cast integral with the mold and therefore serves the dual purpose of moisture storage and mold-centering means.

This annular thickened portion or boss is eliminated in the present type of mold and in place thereof the mold may be supported during the jiggering operation on a chuck adapted to the contour of the mold wall, or the mold may be provided with a series of chuck-engaging members such as lugs, or a base of reinforcing material adapted to fit the standard form of chuck, the chuck-engaging portion of the mold in each instance being designed with a view toward permitting a free circulation of air adjacent the mold wall opposite to that on which the ware is disposed.

The ordinary type of mold used in casting ceramic ware also has thick mold walls, to provide a core or moisture-storage section which is usually sufficient to enable about two successive casting operations, during which time the mold becomes water-logged. The molds then refuse to release the ware when they are parted and have to be taken out of service and thoroughly dried, the period of dehydration normally being from twenty to twenty-two hours. When the molds are used more than twice in succession, a correspondingly greater period of dehydration becomes necessary to condition them for further service.

The first casting operation with a bone-dry mold may be performed in less time than the succeeding operations, as the mold then absorbs the slip-water more readily than it does after the core or thick mold walls have become partly or completely saturated. With a bone-dry mold, the slip may be poured into the mold and the slip water permitted to absorb approximately six minutes, after which the mold is inverted to dump the excess slip and is kept inverted for approximately five minutes to permit the excess slip to drain. The clay which adheres to the mold walls is then permitted to set approximately thirty minutes, after which the mold is parted and the ware removed and trimmed and finished.

During the second or succeeding casting operation, the time required for the clay to set increases approximately fifty percent.

It will thus be seen that if the molds could be thoroughly dried between each casting operation, or during the time the ware is being trimmed and finished, the casting operation could be continuously performed with the same molds.

The present improved type of mold is provided with walls which are limited to a thickness as will permit the moisture from the slip to penetrate therethrough and be carried off by the drying atmosphere during the casting operation, and during the time the mold is empty, or during the trimming and finishing or other operations, the relatively thin walls may be finally and completely dried for the succeeding casting operation.

The present invention also embodies a method of supporting the molds during the drying operation which ensures maximum mold-surface area exposure to the drying atmosphere and free circulation of air adjacent said surface.

While the new mold may appear, on a cursory consideration thereof, to be simply a reduction in the amount of porous absorbing material comprised in the ordinary or standard type of mold, nevertheless this relatively thin mold evolved from careful experiments and tests, inaugurated with a view toward designing a mold which could be used continuously or without being taken out of service after certain periods of use for a thorough drying, and a new and advantageous result has been obtained.

With the ordinary standard type of mold, volume production would be considerably hampered and the cost materially increased, as a large number of extra molds would be required, and when taken out of service for drying, these extra molds occupy considerable floor space and are constantly being damaged due to handling. Thus, in addition to a reduction in the cost of each mold, there is a reduction in the number of molds as well as storage space required and manual labor involved in removing and replacing spent molds.

In the drawing:

Figure 1 is a view in transverse vertical section of a mold for shallow ware constructed in accordance with the features of the invention and disposed on a tray or ware-board particularly adapted therefor, an article of ware, also shown in section, being disposed on the mold;

Fig. 1A is a similar view of a mold constructed in accordance with standard practice, shown for the purposes of comparison and disposed on the usual form of ware-board or store room shelf;

Figs. 2 and 2A are views similar to Figs. 1 and 1A of new and old types of deep ware molds;

Figs. 3 and 4 are fragmentary views in section of the thin-section mold provided with a supporting and strengthening frame or base of non-porous material.

Figs. 5 and 6 are views in transverse vertical section of chucks which may be used with the improved mold during jiggering operations;

Fig. 7 is a top plan view of a partible mold, particularly adapted for cast and undercut jiggered ware, embodying the features of the invention;

Fig. 8 is a sectional view taken on the line 8—8, Fig. 7; and

Fig. 9 is a view in elevation of an open-type of mold-supporting means having a mold disposed thereon.

The reference character M designates the new type of mold having, in the example illustrated, an absorbent mold portion proper of a cross sectional thickness substantially equal to twice the thickness of the formed ware, indicated at W. The old types of mold in Figs. 1A and 2A show in dotted lines the core, designated by C and C' which has been eliminated in the new type of mold and which acts as a storage section for moisture from the ware and prevents access of drying air to the under-side of the absorbent mold portion proper, or that portion of the mold which becomes saturated directly from the clay bat or freshly formed article of ware.

Tests and experiments have shown that when a moist clay bat is applied to a porous plaster mold and shaped into ware, the moisture from the clay penetrates into the mold to a depth approximately equal to the thickness of the ware in two minutes, and in five minutes to a depth approximately equal to twice the thickness of the ware. If, then, the cross-sectional thickness of the mold be limited to the thickness of the ware, for example, and a circulation of air is permitted adjacent the surface of the mold opposite to that on which the ware is disposed, this moisture will be carried away as it penetrates through said surface, the air acting on the moisture approximately within two minutes after the clay is applied to the mold, and if the thickness of the mold is limited to twice the thickness of the ware, the circulating air will act on the moisture approximately within five minutes after application of the clay.

These tests have also demonstrated that if the moisture is constantly removed from the surface of the mold wall opposite to that on which the clay bat or freshly formed article of ware is disposed as it penetrates through the said wall, the extraction of moisture from the ware is expedited, but if the moisture is stored in the core of the mold, this extraction effect is retarded, so that whereas in the old type of mold, after the first application of clay, the extraction of moisture from the ware is retarded due to a sluggishness in the absorptive action of the partly water-logged mold, in the new type of mold the extraction of moisture is maintained constant for each successive application of clay.

A mold with a cross-sectional thickness of substantially twice the thickness of the ware formed from the clay bat has been found to embody strength sufficient to withstand the batting out and profiling operations with ample safety factor, and in the ordinary chain type of dryer, will dry thoroughly during one complete cycle through the dryer provided air is permitted to circulate adjacent the surface of the mold opposite to that on which the ware is disposed.

With the old type of mold and method of drying ceramic ware no attempt was made to facilitate a free circulation of air beneath the mold, the molds usually being disposed indiscriminately on an ordinary solid-surface ware-board or shelf, indicated at B in Figs. 1A and 2A, but in the practice of the present method, it is preferred to use an apertured or open-bottom tray, indicated at T in Figs. 1 and 2. This type of tray or ware-board exposes the entire under or outer surface of the mold to the drying atmosphere and permits a free circulation of air adjacent said surface and also through vents 4 in the tray and around the sides of the mold, and as the seats for the molds are preferably arranged or spaced uniformly on each tray, the molds will be in vertical alinement relatively to the molds on the succeeeding trays in the conveyor chain—assuming that a loop drier is being used—so that any particles that may fall through the vents in the tray will not fall onto the ware below.

The dotted lines which define the core C indicate approximately that portion of the old type of mold which acts as a moisture storage section when the mold with the freshly formed ware thereon is placed on an open tray or ware-board in the drier and air is permitted to circulate adjacent the under surface of the mold. As the air during the preliminary drying stage contains a high percentage of moisture, the core C, in addition to the moisture absorbed from the ware, also absorbs and stores a certain amount of moisture from the atmosphere until its moisture content becomes greater than that of the atmosphere. When the mold is subjected to drying air of say 10% relative humidity, the under surface of the mold dries approximately to a depth as indicated by the dotted lines which define the lower boundary of the core C.

When the old type of mold is disposed on a solid-surface ware board such as those now in use and air is prevented from circulating adjacent the under-surface of the mold, the core also takes in that portion of the mold indicated at C', the moisture from the ware gradually penetrating into the mold to the under surface thereof, and as there is no circulation of drying air adjacent said surface, the moisture also accumulates in the section C'.

The mold in Fig. 1 is shown as being formed with a series of supporting lugs 5, which give a clearance space between the bottom or base of the mold and any flat support on which it may be disposed. This construction permits a free circulation of air beneath the shallow-ware mold when disposed on a flat solid ware board or store room shelf, so that the mold may be used to advantage in either the old or new methods of drying pottery ware. In constructing the new type of mold for shallow ware, it will prove of advantage to design the supporting base with a view toward reducing the concavity in the under portion of the mold as much as possible, to avoid possible formation of a dead air chamber or pocket at the dome of the concavity.

When using the new type of mold with the old form of ware-board or shelf, it may be desired to support the molds on wire-mesh or analogous open supports, to elevate the mold from the board and facilitate the circulation of air beneath the molds, as illustrated in Fig. 9.

In Fig. 2 the deep ware mold is shown provided with a ring 6, by means of which the mold may be supported on the new type of tray.

In Fig. 3 a shallow ware mold is shown provided with a strengthening and protecting ring 6a. This ring supports the mold and braces it against radial strain and protects the plaster from chipping.

In Fig. 4 the mold is provided with a reinforcing framework 7 of latticed or open construction, to reinforce the mold portion proper and at the same time permit access of air to the under surface of said mold portion. The framework 7 is shown as being supported by, or forming part of a ring 6b, which forms the base of the mold and is shaped to center on the standard form of chuck, and the mold portion proper is held in place by a further ring 6c of non-absorbent material which is threaded into the ring 6b. This ring 6c forms the edge of the ware and protects the edge of the plaster and also retards drying of the ware at this point. Another method of reinforcing the mold portion proper is to cast the same with a wire mesh or the like imbedded therein as at 8.

These various reinforcing structures permit a relatively thin cross-sectional mold portion of sufficient strength to withstand the batting out and jiggering operations. In each instance it is preferred to provide the reinforcing frame or base with lugs 5 instead of having a closed wall at this point, to provide for air circulation beneath the mold, as above noted. These lugs in Fig. 4 are adapted to the standard form of jiggering chuck.

Figs. 5 and 6 illustrate types of chucks J adapted for the thin-section molds shown in Figs. 1, 2 and 3. These chucks are shaped so that the molds will center thereon and the relatively thin walls thereof be braced during the batting out and shaping or jiggering operations. A passage or bore j is shown as being formed in the chuck spindle and chuck, said passage terminating in a groove j' which communicates with a series of annular grooves j² formed in the surface of the chuck. A resilient sealing valve j³ is also shown seated in a groove in the chuck to prevent fluid leakage. When the mold is placed on the chuck, sub and super-atmospheric pressure and like fluid mediums may be applied through the passage j to the under surface of the mold and pass through the latter to the clay bat or ware that may be disposed thereon. With the old type of mold, the relatively thick walls thereof retarded the application of the fluid pressure to the clay bat or ware so that its action thereon is delayed, but with the new type of mold, the relatively thin walls thereof facilitate the application of the fluid pressure so that it acts amost instantaneously.

In the old type of mold as shown in Fig. 1A, the chuck-engaging portion of the mold is constructed of moisture absorbing material such as plaster-of-Paris. It has been found by tests that when a mold with a moist clay bat or formed article of ware thereon is placed in a humid atmosphere, any portion of the mold which has not absorbed sufficient moisture from the clay to increase its moisture content beyond that of the surrounding atmosphere immediately absorbs moisture from the surrounding atmosphere, thus lowering the humidity of said atmosphere.

In a ceramic drier, as heretofore noted, to dry the ware properly, it is essential that the relative humidity of the air be high during the preliminary stages of the drying operation. If, therefore, a mold as in Fig. 1A having an excess of porous absorbing material be placed in a humid atmosphere, it immediately absorbs moisture therefrom and lowers its humidity, and in the case of a ceramic dryer, this humidity has to be replaced.

With the new type of mold, the clay bat or formed article of ware effects a substantially immediate saturation of the porous absorbing portion thereof beyond the moisture-content of the surrounding atmosphere and thus no moisture is absorbed therefrom.

When a moist clay bat is applied to a dry mold and shaped into ware, the mold absorbs only part of the moisture from the clay, as the drying atmosphere immediately acts on the surface of the ware which is exposed thereto and this exposed surface is usually wet or extremely moist due to sponging. With the old type of mold, part of the moisture from the ware is absorbed into the mold surface a certain depth, and then as the ware dries and its moisture content is lowered below that of the mold, it exerts capillary attraction on the moisture in the mold and a portion of this moisture is drawn back out of the mold into the ware and passes through the latter into the atmosphere, the remainder of the moisture being absorbed or drawn, also by capillary attraction, into the core of the mold, where it is stored and finally removed through dehydration of the mold, as heretofore noted. As the surface of the ware is usually wet or extremely moist, the drying action on both the ware and mold is delayed, due to the time required by the drying atmosphere to lower the moisture content of the ware below that of the adjacent surface of the mold.

By eliminating the core of the mold and limiting the mold wall to a predetermined thickness, the moisture from the ware is caused to pass directly through the mold to the surface opposite to that on which the ware is disposed, where it is continually removed by the circulating drying air, and as the air removes this surface moisture, it maintains the moisture content of the mold immediately adjacent said surface below that of the surface on which the ware is disposed, with the result that capillary attraction is set up and the moisture which in the old type of mold would be first absorbed into the mold and then removed back through the ware is progressed directly through the mold into the atmosphere. Thus with the new type of mold, when placed in the dryer with the freshly formed ware thereon, substantial equilibrium of moisture content between the ware and mold is reached within a comparatively short period of time, as the moisture taken up by the mold moves always in one direction only, or is removed directly through the mold in a direction away from the ware, while the ware surface moisture and part of the moisture adjacent thereto is removed in the opposite direction, the line of juncture between the ware and mold becoming the neutral point, substantially, and the last point to dry, thereby ensuring substantially simultaneous drying of the ware and mold.

Figs. 7 and 8 illustrate a partible mold, particularly adapted for undercut jiggered ware and for casting pottery ware automatically, embodying the features of the invention. This type of mold is adapted to be opened and closed through angular motion of the supporting means therefor, such as a reversible reciprocable and rotatable chuck. The mold shown is in three sections, designated at 9, which as illustrated are formed of non-porous material, the mold proper M, which is of porous material, being also in sections and secured to the sections 9 by screws 9a. These sections are shiftably mounted on a base 9c, which in turn is shiftably mounted on a main base 9d. Dowels 9e are secured in the main base and project upwardly through arcuate slots formed in the base 9c and into tangential slots 9f formed in the sections 9. The sections are guided radially by pins 9g which are secured in the hub of the base 9c and project into radial bores formed in said sections.

This form of mold is normally carried on an open-bottom tray which is provided with a resiliently mounted pin 9h adapted to engage in a bore formed in the base 9c when the mold is lowered onto the tray. To open the mold, the chuck is caused to rise and elevate the mold clear of the tray but not clear of the pin 9h and then rotate counter-clockwise, which action shifts the locking dowels 9e in the slots 9f and parts the mold sections to permit removal of the ware. The mold is preferably lowered onto the tray in open condition and then subsequently closed by reverse rotation of the chuck or other support.

The foregoing forms no part of the present invention and is recited for the purposes of information. A feature of the mold shown in Figs. 7 and 8 as regards the present invention is the air-circulation space or chamber 10 and the central draft passage or conduit 11 which opens into said chamber through ports 11a. This construction facilitates a draft or free circulation of air around the outer walls of the relatively thin mold portion proper, which ensures carrying away and extraction of moisture from the mold proper as it penetrates through said walls. The mold M may be detached and renewed when desired. The speed of dehydration may be regulated by varying the size of the space or chamber 10 and/or thickness of the mold sections. When the mold is empty and in open position, air will circulate on both sides of the mold proper M and expedite drying of the mold walls, it being understood that cast ware is generally removed from the molds while in a semi-dry or leather-hard state which would also leave the mold in a semi-dry state.

A cover 12 is shown on the mold. This cover may be used as a seal for the chamber 10 in case sub and/or superatmospheric pressure is to be applied to the ware through the walls of the mold M as, for instance, when the mold is parted, to repel the ware from said walls. Air under pressure may be applied to said chamber through either or both the chuck and cover, the latter being provided with hose nipples 12a and 12b for connection with a suitable air control valve, not shown. The nipple 12b is provided in case it is desired to apply atmospheric pressure to the interior of the ware or mold.

It will be obvious that the sections 9 could be of open construction instead of solid, as shown, to thereby expose the outer surface of the mold proper M to the atmosphere.

In the practice of the present method, materials other than plaster-of-Paris can be used with success in the construction of the molds, such, for example, as bisque, which was rendered prohibitive in the old type of mold, due to its weight and expense of construction.

What I claim as new is:

1. In the manufacture of pottery ware, a system of production which consists in shaping the ware on porous molds having a cross-section limited to a thickness which will permit the molds to dry substantially simultaneously with the ware, temporarily reinforcing the molds during shaping and like fabricating operations to prevent breakage of the molds, advancing the molds and ware through a drier, and supporting the molds when placed in the dryer in such a manner that the under or outer surfaces of the molds are exposed to the drying atmosphere, to thereby reduce the cost of mold production and increase the drying efficiency of the molds and production of ware.

2. In the manufacture of pottery, the method of constructing molds which consists in first ascertaining the approximate depth to which the moisture contained in the freshly formed ware for which the mold is adapted will penetrate into a porous molding surface, then casting the mold with a porous mold portion proper substantially limited to a cross-sectional thickness as will permit the moisture from the ware to penetrate directly through the mold to the opposite surface thereof and be carried off by the drying atmosphere in the early stages of the drying operation, to thereby prevent or minimize storage of moisture from the ware in the mold and absorption of moisture from the surrounding atmosphere by the mold and provide for complete drying of the mold during each cycle through the dryer.

3. In the art of producing ceramic ware, the method which consists in shaping the ware on molds having an absorbent mold portion proper limited to a cross-sectional thickness approximately equal to the thickness of the ware for which it is adapted, temporarily reinforcing the molds to withstand the stresses of the shaping operation, and separating the mold from its reinforcement during the drying operation to expose the under and outer walls of the mold to the drying atmosphere and provide for substantial simultaneous drying of the mold and ware.

4. A mold for use in the manufacture of pottery having a predetermined moisture-absorbing capacity in accordance with the particular article of ware for which it is adapted, wherein the thickness of the mold walls is such as to eliminate the excess moisture storage section of the mold and provide for substantial simultaneous drying of the ware and mold, the porous walls of the mold being uninclosed and open to the atmosphere.

5. A mold for use in the manufacture of pottery, constructed with a mold portion proper limited to a cross-sectional thickness which will permit moisture from a freshly formed article of ware to penetrate directly through the porous mold wall to the opposite surface thereof and be exposed to the drying atmosphere in the early stages of the drying operation, the porous walls of the mold being uninclosed and open to the atmosphere.

6. A mold for use in the manufacture of pottery, wherein the thickness of the mold walls is such as to eliminate the moisture storage section of the mold, said mold being cast with a reinforcing material embedded therein, the porous walls of the mold being uninclosed and open to the atmosphere.

7. A mold for use in the manufacture of pottery, wherein the thickness of the mold walls is such as to eliminate the moisture storage section of the mold, said mold being provided with a non-absorptive, brim-forming ring in association with the edge of the mold.

8. A partible mold for use in the manufacture of pottery provided with a porous mold portion proper which is of such a thickness as to avoid storage of moisture in the mold walls, said mold being provided with a reinforcing base or support having a draft conduit therethrough which facilitates a natural circulation of air adjacent the surfaces of the mold portion proper.

9. In the manufacture of pottery ware, the method which consists in forming the ware in or on porous molds having a cross-sectional thickness of approximately twice the thickness of the ware, advancing the molds and ware through a drier, and exposing the surfaces of the molds opposite to that on which the ware is disposed to the drying atmosphere, to thereby carry off the moisture from the ware as it penetrates through the molds to the oposite surfaces thereof and provide for approximately simultaneous drying of the ware and molds.

10. A mold for use in the manufacture of pottery constructed with a mold portion proper having a wall thickness which is limited to substantially twice the thickness of the ware for which it is adapted, to eliminate the moisture storage section or core of the mold, the under and outer walls of the mold being uninclosed and exposed directly to the atmosphere.

11. In combination, a pottery mold having uninclosed walls and a mold portion proper which is limited in thickness to substantially twice the thickness of the ware for which the mold is adapted, and a support of open construction for holding the mold clear of an air-impeding surface during the drying operation.

Signed by me this 16th day of October, 1929.

WILLIAM J. MILLER.